(12) United States Patent
Haumont et al.

(10) Patent No.: US 6,912,402 B1
(45) Date of Patent: Jun. 28, 2005

(54) METHOD SYSTEM AND A NETWORK ELEMENT FOR CONTROLLING POINT-TO-MULTIPOINT TRANSMISSION IN A MOBILE COMMUNICATION SYSTEM

(75) Inventors: Serge Haumont, Helsinki (FI); Ahti Muhonen, Hirvihaara (FI); Michael Rooke, Hyvinkää (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/700,186
(22) PCT Filed: May 12, 1999
(86) PCT No.: PCT/FI99/00413
§ 371 (c)(1), (2), (4) Date: Nov. 13, 2000
(87) PCT Pub. No.: WO99/59355
PCT Pub. Date: Nov. 18, 1999

(30) Foreign Application Priority Data

May 13, 1998 (FI) .................................................. 981065

(51) Int. Cl.⁷ ................................................ H04Q 7/20
(52) U.S. Cl. ...................... 455/519; 455/517; 455/521
(58) Field of Search ............................... 455/517, 518, 455/519, 520, 521, 426.1, 426.2, 503, 466, 500, 458

(56) References Cited

U.S. PATENT DOCUMENTS

| | | | | |
|---|---|---|---|---|
| 3,914,692 A | * | 10/1975 | Seaborn, Jr. ................ | 455/521 |
| 5,173,688 A | * | 12/1992 | DeLuca et al. ............ | 340/7.55 |
| 5,473,642 A | * | 12/1995 | Osawa et al. ............... | 375/377 |
| 5,491,835 A | * | 2/1996 | Sasuta et al. ............... | 455/509 |
| 5,566,181 A | * | 10/1996 | Huang et al. ............... | 370/312 |
| 5,636,230 A | * | 6/1997 | Marturano et al. ......... | 714/748 |
| 5,771,459 A | * | 6/1998 | Demery et al. ............. | 455/517 |
| 5,812,531 A | * | 9/1998 | Cheung et al. ............. | 370/255 |
| 5,819,178 A | * | 10/1998 | Cropper ...................... | 455/433 |
| 5,850,611 A | * | 12/1998 | Krebs .......................... | 455/518 |
| 6,026,296 A | * | 2/2000 | Sanders et al. .......... | 455/426.1 |
| 6,212,393 B1 | * | 4/2001 | Suarez et al. ............ | 455/456.4 |
| 6,351,467 B1 | * | 2/2002 | Dillon ........................ | 370/432 |
| 6,360,076 B1 | * | 3/2002 | Segura et al. ............ | 455/67.11 |
| 6,477,384 B2 | * | 11/2002 | Schroderus et al. ........ | 455/500 |
| 6,529,740 B1 | * | 3/2003 | Ganucheau et al. ........ | 455/519 |

* cited by examiner

Primary Examiner—Tilahun Gesesse
(74) Attorney, Agent, or Firm—Pillsbury Winthrop Shaw Pittman LLP

(57) ABSTRACT

A method, a system and a network element for controlling the transmission of a message to be transmitted point-to-multipoint in a mobile communication system. In order to take the topically of the content of the message to be transmitted point-to-multipoint into account, a life time is determined for the message in the method and the message waiting to be transmitted is deleted from the buffer (210) in response to expiry of the life time.

17 Claims, 3 Drawing Sheets

METHOD SYSTEM AND A NETWORK ELEMENT FOR CONTROLLING POINT-TO-MULTIPOINT TRANSMISSION IN A MOBILE COMMUNICATION SYSTEM

This application is the national phase of international application PCT/FI99/00413 filed May 12, 1999 which designated the U.S.

BACKGROUND OF THE INVENTION

The invention relates to point-to-multipoint transmissions in a mobile communication system and, more particularly, to point-to-multipoint transmissions which have to be acknowledged.

Mobile communication systems have been developed in order to free people from fixed telephone terminals without hindering their reachability. Coinciding with the increased use of various data transmission services at offices, a plurality of data services has also appeared in mobile communication systems. Mobile networks for their part provide a user with an efficient access network for mobile data transmission, the network giving the user access to the actual data networks. On this account, various new forms of data services are being designed for the current and future mobile communication networks. Digital mobile communication systems, like the Global System for Mobile Communication GSM, are particularly suitable for supporting mobile data transmission.

Figure 1:
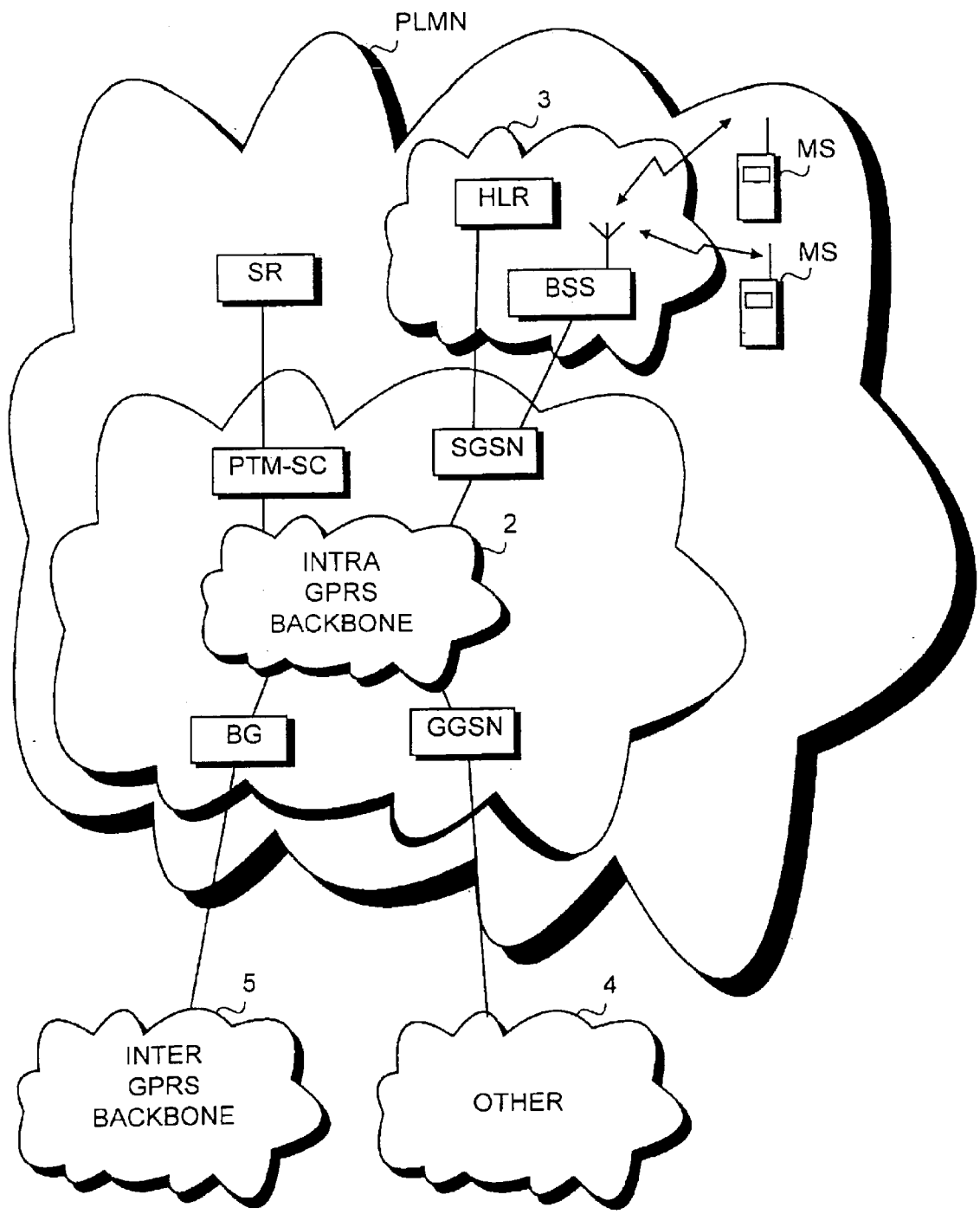

The General Packet Radio Service GPRS is a new service in the GSM system and one of the objects of GSM Phase 2+ standardization at ETSI (European Telecommunication Standard Institute). The GPRS allows packet data transmission to be established between mobile data terminals and external data networks, with the GSM network functioning as an access network. One of the requirements set for the GPRS is that it must interwork with different types of external data networks, such as the Internet or the X.25. networks. In other words, the GPRS and the GSM network should be able to serve all users, irrespective of which type of data networks the users wish to enter through the GSM network. This means that the GSM network and the GPRS must support and process various types of network addressing and data packet formats. The processing of data packets also comprises their routing in a packet radio network. Further, users should be able to roam from the GPRS home network to another GPRS network, whose operator backbone network may support a protocol (e.g. CLNP) different from that of the home network (e.g. X.25). The GPRS network architecture is illustrated in FIG. 1.

The GPRS supports both point-to-point and point-to-multipoint transmissions. The aim of a point-to-multipoint transmission is to allow a sender to transmit data to recipients in a destination area by using one service request. The term 'data' refers in this application to any information to be conveyed in a digital telecommunication system. The information may comprise digitized speech, inter-computer data communication, telefax data, short program code segments etc. The destination area is a geographical area determined by the sender. The destination area is determined either in the service request or when the starting of a point-to-multipoint transmission is notified.

To control point-to-multipoint transmissions the GPRS network typically comprises a Point-To-Multipoint Service Centre PTM-SC, which is an essential element in the point-to-multipoint service. The centre receives service requests from a Service Requester and transmits the service to its service area via the Serving GPRS Support Node SGSN. Actual point-to-multipoint services supported by the GPRS are Point-to-Multipoint Multicast PTM-M and Point-To-Multipoint Group call PTM-G. In the GPRS system, the term 'group' refers to several mobile stations which have registered with the same International Mobile Group Identifier IMGI. Groups can either be open or closed. An open group can be joined by anyone, whereas a closed group includes only the subscribers who have been defined to belong to the group in the service centre PTM-SC. Besides the actual point-to-multipoint transmissions, the GPRS supports IP Multicast IP-M according to the Internet protocol.

A PTM multicast PTM-M is broadcast in all the cells belonging to the destination area. It can be directed to all mobile stations in the cells or to mobile stations belonging to a certain group. A PTM multicast is unidirectional, non-encrypted and unreliable. Thus, anyone can listen to the transmission and the sender cannot know, whether the receiver/s has/have received the message. A message to be transmitted as a PTM multicast includes scheduling information. Scheduling information comprises the starting time, the end time and the frequency rate of the transmission. If the starting time zero is given, it deals with a real time transmission. Real time means that a message received from the service requester is transferred as quickly as possible. Transmission rate and transmission time delay vary depending on the loading of the network elements. If each piece of scheduling information is marked with zero, it deals with a real time single transmission. If the starting time is other than zero, it deals with a delayed transmission. On the basis of the time difference between the starting and end time and of the frequency rate, the service centre PTM-SC calculates the number of transmission repetitions and the time slot between the repetitions. By using this information, PTM-SC controls the transmissions of the message. The end time is only used in calculating the control information of the above mentioned transmissions.

A PTM group call PTM-G is transmitted in the cells of the destination area which include at least one mobile station registered to the group. Only a mobile station registered to the group in the area of a serving support node SGSN can receive messages of a group call and decode the encryption. Thus, the network is aware of the location of the registered mobile stations. A PTM group call can be transmitted as a broadcast, a point-to-point transmission or as a combination of these. A group call is always individualised by the mobile group identity IMGI. In a PTM group call, a transmission is either uni-, bi- or multidirectional, encrypted and reliable. Usually the messages of a PTM group call are transferred in real time. It is also possible to employ a delayed transmission and/or repeated transmissions as in the PTM multicast. Since a PTM group call is reliable, at least a broadcast group call must be acknowledged. In case of a negative acknowledgement, a mobile station transmits the acknowledgement only if it notices that it has not received the previous PTM message or messages. In such a case, the service centre transmits the missing messages to it. In case of a positive acknowledgement, each PTM message is acknowledged individually. A positive acknowledgement is especially applicable to cases in which the reliability requirements are strict. In both manners of acknowledging, each acknowledgement transmitted by a mobile station is conveyed via the serving support node SGSN to the service centre, which decides on the following actions on the basis of the acknowledgements. At the end of the PTM group call, the service centre PTM-SC transmits a report to the service requester.

On the basis of what is described above, a problem arises that a point-to-multipoint message can only be transmitted after the content of the message has already gone out of date. This is the case particularly in the transmissions which have to be repeated and transmitted as scheduled. On the other hand, a group message which has to be acknowledged cannot be delivered to the mobile stations which have not received it at the time of the actual transmission, although the mobile stations arrived at the destination area during the time the content of the message has not yet gone out of date.

BRIEF DESCRIPTION OF THE INVENTION

It is thus the object of the invention to provide a method and an apparatus implementing the method in such a way that the above problems can be eliminated. The objects of the invention are achieved by a method, which is characterized by determining a life time for a message, and deleting the message from a buffer in response to the expiry of the life time.

The term 'buffer' refers herein to a memory, in which the message is temporarily stored to wait for forwarding and/or successive transmissions.

The invention also relates to a mobile communication system, to which the method of the invention can be applied. The system comprising at least one service centre PTM-SC to transmit a message as a point-to-multipoint transmission and at least one network element SGSN via which the message is transmitted to cells belonging to a destination area is characterized in that the service centre PTM-SC is arranged to determine the remaining life time of the message and to check before transmitting the message, whether there is life time left and to transmit the message only if there is still life time left.

The invention further relates to a network element of a mobile communication network, by which network element the method of the invention can be applied. The network element is characterized in that it comprises means for determining the remaining life time of a message to be transmitted point-to-multipoint, and means for transmitting said message according to the scheduling of the message, if there is still life time left.

The invention is based on giving a message a precise life time. As the life time expires, the message will not be transmitted anymore. At its simplest, this is ensured by deleting the message from the transmission buffer. This provides the advantage that the service requester may transmit fairly short-lived information as a point-to-multipoint transmission, because the requester knows that everyone receives the information before it goes out of date. A dated message is deleted from the group of messages to be transmitted, even if it had not been transmitted at all because of the great transmission delays. This saves the network resources and the recipients do not receive unnecessary messages.

In a preferred embodiment of the invention relating to group calls transmitted as calls to be acknowledged, it is checked whether a predetermined part of the group members has acknowledged the message, and if it has, the message will not be transmitted anymore. This provides the advantage that the message transmitted as a group call will not be unnecessarily retransmitted. This saves the network from unnecessary loading.

In a preferred embodiment of the invention, in which a message is received from another network element, the acknowledgement transmitted to it includes information on the group members who have received the message. This provides the advantage that the loading of the network decreases substantially. In known prior art solutions, acknowledgements are transmitted individually to the service centre PTM-SC. The acknowledgements differ from each other only in respect of the subscriber identification data. When using positive acknowledgements in particular, the loading of the network decreases. If e.g. the support node SGSN succeeds in transmitting a PTM group call to x subscribers, it only conveys one acknowledgement, instead of x acknowledgements, to the service centre PTM-SC.

In a preferred embodiment of the invention, the service centre attempts during the whole life time of the message to transmit the message to those group members who become reachable during the life time of the message and have not yet received the message. This provides the advantage that a long life time of a message allows the service requester to ensure that as many group members as possible get the important message. An effort is not, however, made to resend the message to those who have already received it. This saves the network resources.

The preferred embodiments of the method, system and network element of the invention are disclosed in the attached dependent claims.

LIST OF FIGURES

Figure 2:
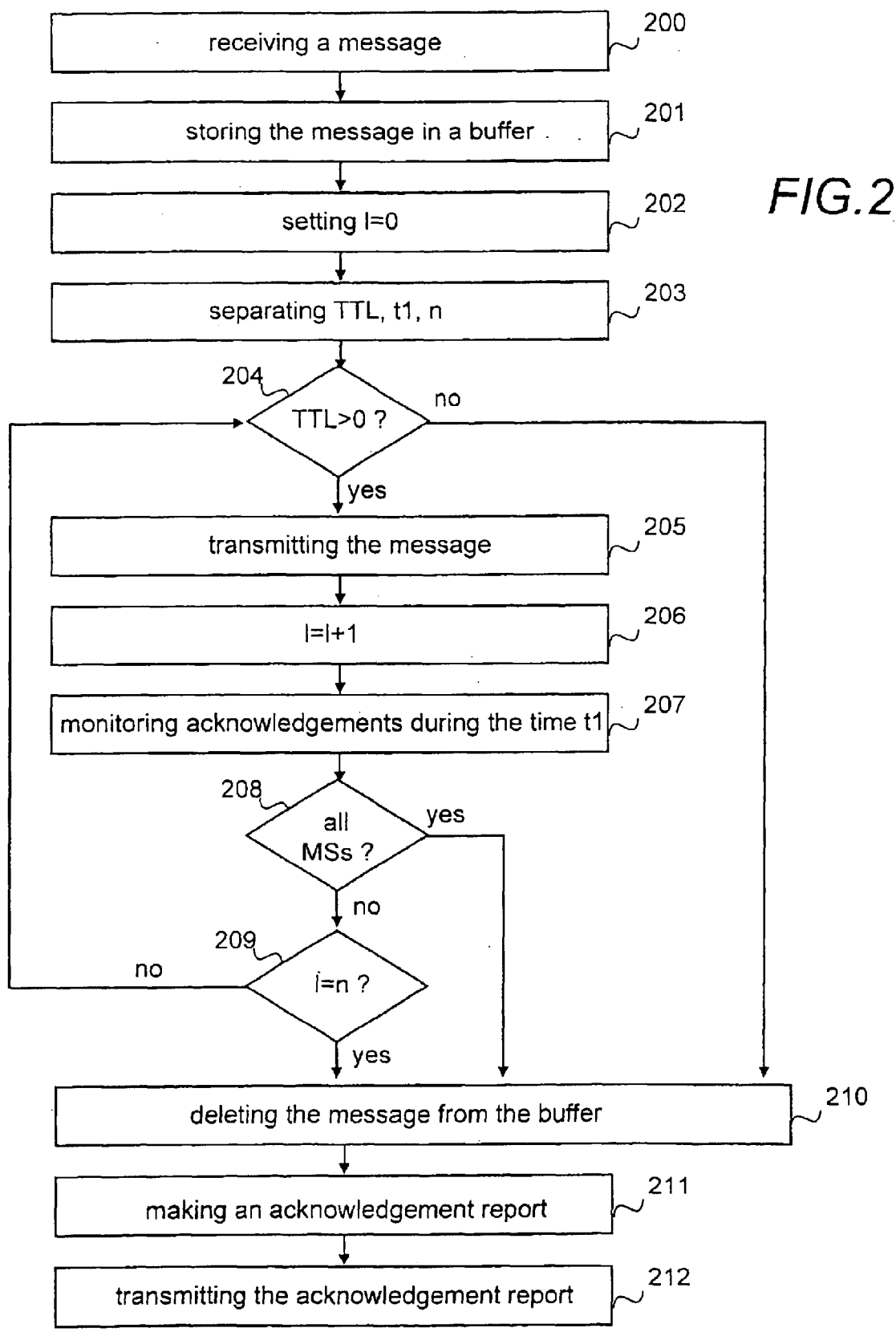
Figure 3:
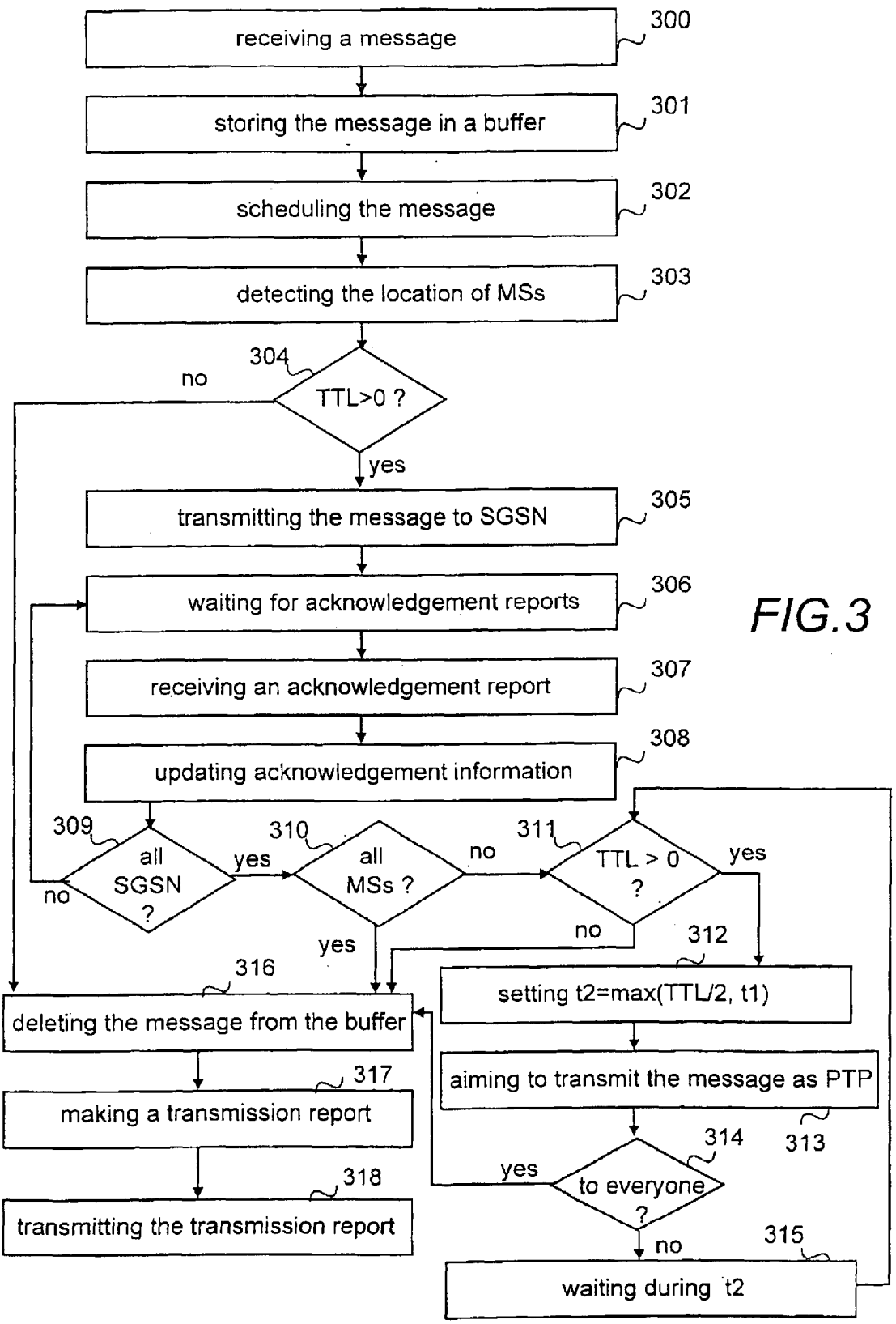

In the following the invention will be described in greater detail in connection with the preferred embodiments, with reference to the attached drawings, in which FIG. 1 shows a block diagram of some elements in a packet radio system of the invention, FIG. 2 shows a flow chart of an operation in a serving support node SGSN according to a first preferred embodiment of the invention, and FIG. 3 shows a flow chart of an operation in a service centre PTM-SC according to the first preferred embodiment of the invention.

DETAILED DESCRIPTION OF THE INVENTION

In the following, the preferred embodiments of the invention will be described by means of GPRS packet radio networks yet without restricting the invention to such a specific packet radio system. The invention is applicable to all mobile communication systems in which point-to-multipoint transmissions are possible, e.g. to the third-generation mobile communication systems UMTS (Universal Mobile Telecommunication System) and IMT-2000 (International Mobile Telecommunication 2000) which are under development. It is to be noticed that the packet radio network only provides a physical connection between the PTM service centre and the service recipient, and the exact operation and structure of the network have no substantial meaning for the invention. The specifications of mobile communication systems in general and of the GPRS system in particular evolve fast. Various functionalities of the network elements may change. Therefore, all terms and expressions should be interpreted as widely as possible, and they are intended to describe and not to limit the invention.

FIG. 1 shows an example of a GPRS packet radio network PLMN. A GPRS operational environment 1 comprises one or more subnetwork service areas, which are connected to each other by an Intra-GPRS Backbone Network 2. A subnetwork comprises a set of packet data service nodes SN, which are herein called serving GPRS support nodes SGSN, each of which is connected to a GSM mobile communication network 3, and typically to its base station systems BSS, in such a way that it is able to provide mobile stations MS with a packet data service via various base stations, i.e. cells. A mobile station refers herein to the entity of a mobile communication network subscriber and a data terminal equipment. The mobile communication network 3 between them provides packet-switched data transmission between the support node and the mobile stations.

On the network side, each support node SGSN controls certain functions of the packet radio service in the area of one or more cells in a cellular packet radio network. Such functions are e.g. logging of the mobile stations MS in and out of the system, updating routing zones of the mobile stations MS and routing of data packets to their correct destinations. The mobile station MS located in the cell communicates through the mobile communication network with the support node SGSN that constitutes the service area for the cell. The functions of the serving support node SGSN according to the first preferred embodiment of the invention are described in more detail later in connection with FIG. 2.

The different subnetworks in turn are connected to an external data network 4, e.g. to a packet switched public data network PSPDN, the Internet network or to the integrated services digital network ISDN, via specific gateway GPRS support nodes GGSN. Thus, the GPRS provides packet data transmission between mobile data terminal equipment and external data networks with the GSM network 3 serving as an access network. The different mobile communication networks are connected to each other by an Inter-GPRS Backbone Network 5. The GPRS operational environment 1 comprises a Border Gateway BG situated on the connection between the mobile communication networks. The GPRS subscriber data and the routing information are stored in the home location register HLR of the GSM network.

To control point-to-multipoint transmissions the GPRS network typically comprises a point-to-multipoint service centre PTM-SC. The service centre PTM-SC is the central element in the point-to-multipoint service and it is responsible for the geographical routing of messages. It receives service requests from the service requester SR and transmits the service via the support node/s SGSN of its service area. In other words, it takes care of the scheduling, transmission and retransmission of messages according to given parameters. The functions of the service centre according to the first preferred embodiment of the invention are described in more detail in connection with FIG. 3. Some of the service centre functions can be decentralized into other network elements, e.g. into the support node SGSN which can take care of at least some of the transmissions in the system of the invention. So far, GPRS specifications do not determine how a PTM service centre is connected to a network. FIG. 1 shows one alternative, in which the PTM service centre is connected to the internal backbone network 2.

In the system of the invention, the service requester SR is not limited in any way. The service requester can thus be an independent service provider transmitting its service request via other networks 4. The service requester SR can also have a direct connection to the service centre PTM-SC located in the network, as shown in the example of FIG. 1. The service requester can also be a network element or a terminal, whose service request is forwarded to the service centre PTM-SC. Further, it can be some other service centre PTM-SC.

To implement the invention, any equipment changes do not need to be made to the network structure described above. The service centre PTMSC SC and the serving support nodes comprise processors, timers and memory, which can be utilized in buffering the message and observing the life time. All the changes needed for implementing the invention can instead be performed as added or updated software routines in the service centre PTM-SC and/or in the serving support node SGSN. The invention can thus be implemented relatively easily in the network elements.

FIG. 2 shows the operation of a serving support node SGSN in a first preferred embodiment of the invention. In the first preferred embodiment of the invention, the serving support node is assumed to be an "intelligent" serving support node. Intelligent means that the support node itself takes care of the transmissions, selects the mode of transmission (a broadcast or a point-to-point transmission) and detects the cells which include mobile stations registered to the group and which mobile stations have registered to the group.

With reference to FIG. 2, one group message is received from the service centre by the serving support node SGSN in step 200, which message is stored in a transmission buffer in step 201. The group message is a message transmitted as a group call (PTM-G). In step 202, zero is set as the number of transmissions I (I=0). The remaining life time TTL, the waiting time t1 of acknowledgements and the maximum number of transmissions n are separated from the group message in step 203. In the following, waiting time of acknowledgements is also called acknowledgement time. In the first preferred embodiment of the invention, the acknowledgement time is the same as the time slot between the transmissions. This provides the advantage that it is checked before each transmission, whether the transmission conditions will be fulfilled. In step 204 it is checked, whether the message still has life time left, i.e. whether TTL>0. If it has, the message is transmitted in step 205 to the cells which include mobile stations registered to the group. In the first preferred embodiment, the message is transmitted to the mobile stations either as a broadcast of a cell or as a point-to-point transmission from a serving support node to a mobile station depending on which alternative loads the network less. The support node calculates the loads and decides on the mode of transmission in accordance with the routing zones. Usually one cell corresponds to one routing zone.

After the transmission, the number of transmissions I is updated by increasing it by one in step 206. Thereafter, acknowledgements of the mobile stations are being monitored in the serving support node in step 207 during the acknowledgement time t1. The calculation of the acknowledgement time t1 begins at the instant of the transmission in the first preferred embodiment. If negative acknowledgements are received during this time, the missing part of the message is retransmitted in the first preferred embodiment. In some other embodiment, the missing parts of the message cannot be transmitted until in connection with the next transmission, or the service centre PTM-SC decides on their transmission on the basis of the acknowledgement report received by it. As the acknowledgement time t1 has expired, it is checked in step 208, whether all the mobile stations registered to the group in the area of the serving support node have acknowledged the message as received. This provides the advantage that the message is not transmitted unnecessarily, if everyone has already received it. Successful point-to-point transmissions are also regarded as acknowledged. If someone has not acknowledged the message, it is checked in step 209, whether the maximum number of messages has already been transmitted (I=n?). If not, it is returned to step 204, in which it is checked whether there is still life time left. In step 205, different types of transmission solutions can be made at different transmission times owing to the fact that e.g. the mobile stations that have already acknowledged the message are "forgotten" when comparing the loading caused by a broadcast and that of point-to-point transmissions.

The loop formed by steps 204 to 209 is repeated until everyone has acknowledged the message (step 208), the maximum number of transmissions is reached (step 209) or the life time of the message has expired (step 204). If one of these conditions is fulfilled already in the first cycle, the loop is left without repeating it once. After leaving the loop, the message is deleted in step 210 from the buffer of the serving support node, an acknowledgement report is made in step 211, which report is transmitted to the serving centre PTM-SC in step 212. In the first preferred embodiment, the acknowledgement report includes a list of mobile stations which have received the message and informs of the quality of the used service. In some other embodiment, the acknowledgement report can only include one piece of this information, either the information on the mobile stations which have not acknowledged the message as received or the information on the mobile stations which reported on the missing of the message. The information can also be represented in some other way than in the form of a list, e.g. as different parameters. Sufficient information may be e.g. the percentage of the acknowledged mobile stations. Making only one acknowledgement report has the advantage that different acknowledgements do not need to be transmitted individually. This saves the network resources.

In an embodiment in which the message is deleted from the buffer as soon as the life time has expired and there still is life time left, the expiry of the acknowledgement time is awaited and only thereafter, the acknowledgement report is made. Hereby, the acknowledgement report informs of the real situation.

It was assumed above that the waiting time t1 of the acknowledgements is the same as the time slot between the successive transmissions of the message. In some other embodiment, the waiting time t1 of the acknowledgements can be e.g. three times as long as the time slot between the transmissions, or a support node specific constant, like delay. If the waiting time of the acknowledgements is a predetermined constant, of which the serving support node is aware, it does not have to be included in the message and thus separated in step 203. The same applies to the time slot between the transmissions to be repeated, too. If the time slot between the transmissions is not a constant and it is some other than the waiting time of the acknowledgements, it must be included in the scheduling information and separated from the message.

In the above, the maximum number of transmissions was restricted to n transmissions. In some embodiments this restriction is not used, whereupon n need not be separated from the message and the checking in step 209 does not need to be performed. The maximum number of transmissions can also be a constant, of which the serving support node is aware. In this case, it need not be included in the scheduling information of the message. In some embodiments, the missing of the maximum number of transmissions from the message results in giving up the checking in step 209.

Unlike above, the number of mobile stations the service aims to reach, e.g. 90%, can further in some embodiments be given as transmission information, e.g. scheduling information, of the message. In this case, it is moved from step 208 to step 210, if 90% of the mobile stations registered to the group in the area of the serving support node have acknowledged the message as received.

In an embodiment, the scheduling information of the message can also include information on the starting time of the first transmission. In this case, the beginning of the starting time of the transmission is awaited before the checking in step 204.

FIG. 3 shows the operation of a service centre PTM-SC in the first preferred embodiment. In step 300, a group message is received in the service centre PTM-SC from a service requester, the message being stored in a buffer of the service centre PTM-SC in step 301. Thereafter, the message is scheduled in step 302. Scheduling the message means that after the scheduling, the message includes in the first preferred embodiment at least the following information: the remaining life time TTL, the maximum number of transmissions n and the time slot t1 between the transmissions. The scheduling information can be received from the service requester in the message. A portion of scheduling information or all scheduling information can be predetermined either in group specifications or in service definitions of the service requester. For example, the life time of a message can be determined to expire always at the end of the day. Part of the scheduling information can also be support node specific constants, in which case they are not added to the scheduling information in the service centre. In the first preferred embodiment, the end time of the scheduling information is used as the expiry time of the life time. This provides the advantage that any new scheduling information is not needed. In some other embodiment, the life time can also be given separately in cases when it is not determined in advance.

After the message is scheduled, it is detected in step 303 which cells of the destination area include mobile stations MS registered to the group. In the first preferred embodiment it is enough that those serving support nodes SGSN are found to which an activated group routing context exists, letting the support nodes check the cells more accurately. In some other embodiment, the service centre PTM-SC may check the cells and their mobile stations. As the locations of the mobile stations registered to the group in the destination area are known, it is checked in step 304, whether the life time TTL still remains. If there is still life time left, the message is transmitted in step 305 to the serving support nodes on whose area there are mobile stations registered to the group. Thereafter, acknowledgement reports are waited from the serving support nodes in step 306.

After the acknowledgement report is received in step 307, the acknowledgement information is updated in step 308 by the information of the acknowledgement report. Thereafter, it is checked in step 309 in the first preferred embodiment, whether an acknowledgement has been received from all serving support nodes SGSN to which the group message was transmitted in step 305. If not, the process starts anew in step 306 where the acknowledgement reports are awaited. After the acknowledgement has been received from all serving support nodes SGSN, it is checked on the basis of the acknowledgement information in step 310, whether all the mobile stations in the group received the message. Checking all the group members instead of only the members registered to the group in the destination area enables the delivery of the message to the mobile stations registered after the actual transmission. The actual transmission refers to a transmission performed by the serving support node. If the mobile stations belonging to the group have not received the message, it is checked in step 311, whether there is still life time left for the message. If there is, the waiting time t2 is set in the first preferred embodiment in step 312. In the first preferred embodiment, the time t2 is half of the remaining life time checked in step 311, yet at least a predetermined minimum time, e.g. the acknowledgement time or the time t1 between the transmissions (t2=max(TTL/2, t1). This provides the advantage that as the remaining life time of the message is expiring, a more intense effort is made to reach the mobile stations which have not yet received the message. In step 313, the aim is to transmit the message to the mobile stations of the destination area which have not yet received it as a point-to-point transmission between the service centre and the mobile station. If it was observed in step 314 that the message could not be transmitted to everyone, the process changes to step 315, where the expiry of the time t2 is awaited. When the time t2 expires, it is returned to step 311 where it is checked, whether there is still life time left.

The loop formed by steps 311 to 315 is repeated until either everyone has received the message or the life time of the message has expired. After leaving the loop, the process changes to step 316 in which the message is deleted from the buffer of the service centre. A transmission report is made in step 317 and transmitted to the service requester in step 318. The transmission report may include information on the mobile stations which received or did not receive the message in order to charge the mobile stations only for the received messages, for example. Further, the transmission report can according to the prior art include information on the quality of the transmission (QoS) and other information as well.

In some other embodiments, it can be checked in step 310, whether e.g. a sufficient number of mobile stations belonging to the group or registered to the group in the destination area has acknowledged the message. It is also possible to check, which type of service the mobile station which has not acknowledged the message has ordered. If the mobile station has ordered e.g. super service, then the loop formed by steps 311 to 315 is repeated, but if it has ordered a normal service, an effort is no longer made to transmit the message from the service centre to the mobile station.

Instead of transmitting point-to-point in step 313, the message can in some other embodiment be transmitted to the serving support nodes SGSN whose area includes the mobile stations which did not receive the message.

Instead of the loop formed by steps 311 to 315, an arrangement according to short message service can be implemented, where the home location register informs the service centre PTM-SC of the now reachable mobile station in the destination area. If there still remains life time for the message, the message is transmitted to the mobile station. This feature could be incorporated only to the mobile stations whose subscribers are willing to pay for the reception of the message a bit more. It is also possible that PTM-SC checks at regular intervals during the life time of the message, whether the mobile station has registered to the group in the destination area, and if it has, transmits the message to it. From step 309 the process may also change directly to step 316. If the service request has been transmitted both to the serving support nodes and to some other service centre, the report of this service centre is awaited in step 309 as well.

In a preferred embodiment of the invention, the service centre PTM-SC is aware of which mobile stations have registered in which routing zone under which support node SGSN. In this case, the life time is checked before transmission only in the service centre PTM-SC. The service centre informs the support node SGSN of which packet has to be broadcast in which routing zone and which packet has to be transmitted as a PTP connection to which group member. Further, the service centre informs SGSN of the group members whose acknowledgements SGSN awaits either for a certain constant period of time or for a reported period of time. SGSN takes care of the transmissions and waits for the acknowledgements according to the instructions. After the acknowledgement time has expired, the support node SGSN transmits the received acknowledgements in an acknowledgement report to the service centre PTM-SC, which decides on the following actions on the basis of the acknowledgements and the remaining life time.

The steps described above in connection with FIGS. 2 and 3 are not in absolute chronological order and some of the steps can be performed simultaneously or in different order than above. Between the steps, also other functions, which relate to transmitting different point-to-multipoint transmissions, can be performed. Some of the steps can also be left out or they can be performed in another network element. It is essential that the life time of the message is under observation, and that at some point of the transmission, the remaining life time is checked or it is in some other way arranged that the message whose life time has expired will not be transmitted. The invention does not in any way relate to how group routing connections are being set up, who belong and/or are allowed to belong to the group, by which algorithm the transmission mode of the messages is selected, or how the destination area and its recipients are detected. The invention is not in any way restricted to the transmission of complete messages only, but it can be as well applied to cases in which the message has to be split into smaller frames. Although the invention is described above by relating to a message to be transmitted as a group call which has to be acknowledged, the invention is not restricted only to such point-to-multipoint transmissions. It will be apparent to a person skilled in the art how the invention is applied to other group calls and multicasts.

It is to be understood that the above description and the related figures have merely been presented to illustrate the present invention. Different variations and modifications of the invention will be apparent to those skilled in the art without departing from the scope or spirit of the invention as defined in the appended claims.

What is claimed is:

1. A method for controlling a point-to-multipoint transmission of a message in a mobile communication system, the method comprising
   receiving the message,
   storing the message in a buffer of the messages to be transmitted,
   scheduling the message,
   transmitting the message located in the buffer according to the predetermined scheduling,
   determining a life time for the message, and
   deleting the message from the buffer in response to the expiry of the life time.

2. A method as claimed in claim 1, comprising:
   checking before transmitting the message, whether there is life time left, and
   if there is, transmitting the message,
   if there is not, deleting the message from the buffer.

3. A method as claimed in claim 2, comprising:
   determining an acknowledgement time for the message to be transmitted as a group call,
   transmitting the message to the group members,
   waiting for the acknowledgements of the group members during the acknowledgement time, checking after the expiry of the acknowledgement time, whether a predetermined part of the group members has acknowledged the message, and if it has, deleting the message from the buffer, if it has not, transmitting the message located in the buffer to the group members from whom an acknowledgement has not been received.

4. A method as claimed in claim 1, comprising:

receiving the message to be transmitted from another network element, making a report on the successful transmission of the message in response to deleting the message from the buffer, and transmitting the report to said another network element.

5. A method as claimed in claim 1, comprising:

receiving the message to be transmitted as a group call in the first network element, storing the message in the buffer of the first network element, transmitting the message to the second network element, transmitting the message from the second network element to the group members, waiting for the acknowledgements of the group members in the second network element during the acknowledgement time after the transmission, making a report on the acknowledgements in the second network element after the expiry of the acknowledgement time, and transmitting the report to the first network element.

6. A method as claimed in claim 5, comprising:

storing the message also in the buffer of the second network element, deleting the message also from the buffer of the second network element in response to the expiry of the life time of the message, checking in the second network element after the expiry of the acknowledgement time, whether a predetermined part of the group members has acknowledged the message, and if it has, making a report on the acknowledgements and deleting the message from the buffer of the second network element, if it has not, transmitting the message located in the buffer to the mobile stations from whom an acknowledgement has not been received.

7. A method as claimed in claim 6, comprising:

determining the maximum number of transmissions for the message in the second network element, calculating the number of the realized transmissions, checking before transmitting the message, whether the number of the realized transmissions is the same as the maximum number, and if it is, making a report on the acknowledgements and deleting the message from the buffer of the second network element, if it is not, transmitting the message located in the buffer.

8. A method as claimed in claim 6, comprising giving a report on the acknowledgements, if the message has been deleted from the buffer of the second network element before transmitting.

9. A method as claimed in claim 5, comprising the report including the group members who acknowledged the message as received.

10. A method as claimed in claim 9, comprising the first network element being arranged to transmit the message to the group members who did not acknowledge the group message, if these group members become reachable before the life time of the message expires.

11. A mobile communication system comprising at least one service centre to transmit a message as a point-to-multipoint transmission and at least one network element via which the message is transmitted to cells belonging to a destination area, wherein the service centre is arranged to determine the remaining life time of the message and to check before transmitting the message, whether there is life time left and to transmit the message only if there is still life time left.

12. A mobile communication system as claimed in claim 11, wherein the network element is arranged to determine the remaining life time of the message and to check before transmitting the message, whether there is life time left and to transmit the message only if there is still life time left.

13. A mobile communication system as claimed in claim 11, wherein the network element is arranged to receive acknowledgements from the group members during a certain acknowledgement time and to transmit the information on the acknowledgments in one message to the service centre.

14. A network element of a mobile communication network which network supports the point-to-multipoint transmission of a message, wherein the network element comprises means for determining the remaining life time of a message to be transmitted point-to-multipoint, and means for transmitting said message according to the scheduling of the message if there is still time left.

15. A network element as claimed in claim 14, wherein it also comprises means for determining the acknowledgement time for the message to be transmitted as a multipoint group call which as to be acknowledged, means for monitoring the acknowledgement until the acknowledgement time has expired, and means for compiling the acknowledgements as one acknowledgement report.

16. A network element as claimed in claim 14, wherein it comprises means for transmitting the message to be transmitted as a multipoint group call which has to be acknowledged during the life time of the message to the group members who are reachable in the destination area of the message and who have not acknowledged the message as received.

17. A network element as claimed in claim 14, wherein it comprises a processor which is arranged to carry out software routines and that said means are implemented as software routines.

* * * * *